United States Patent
Feiler

(10) Patent No.: US 6,563,692 B2
(45) Date of Patent: May 13, 2003

(54) CAPACITOR

(75) Inventor: Wolfgang Feiler, Reutlingen (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 10/118,795

(22) Filed: Apr. 9, 2002

(65) Prior Publication Data

US 2002/0181187 A1 Dec. 5, 2002

(30) Foreign Application Priority Data

Apr. 10, 2001 (DE) .......................... 101 17 799

(51) Int. Cl.⁷ ............................................. H01G 9/008
(52) U.S. Cl. ..................................... 361/520; 361/538
(58) Field of Search ................................ 361/503, 517, 361/518, 519, 520, 521, 535, 536, 537, 538

(56) References Cited

U.S. PATENT DOCUMENTS 4,433,361 A * 2/1984 Wolf et al. ................. 361/520
4,525,022 A * 6/1985 Murray ....................... 439/741

OTHER PUBLICATIONS

J. Roumen, "New Aluminum Electrolytic Capacitors with Low Inductance Allow Advanced Frequency Converter Design", PCIM 2000 Conference Proceedings, Session PC, PC6.6 Jun. 2000.

* cited by examiner

*Primary Examiner*—Dean A. Reichard
*Assistant Examiner*—Eric Thomas
(74) *Attorney, Agent, or Firm*—Kenyon & Kenyon

(57) ABSTRACT

A capacitor, particularly, an electrolyte capacitor, with low inductance includes a housing part, at least one capacitor reel including two capacitor electrodes insulated from each other by a dielectric and positioned in the housing part, and a housing bottom having at least one feed-through for contacting the capacitor electrodes and on which are arranged outer terminals for capacitor electrodes, the outer terminals being positioned so that one of the two outer terminals encircles the other terminal at least partially, and the two outer terminals are electrically insulated from each other.

11 Claims, 5 Drawing Sheets

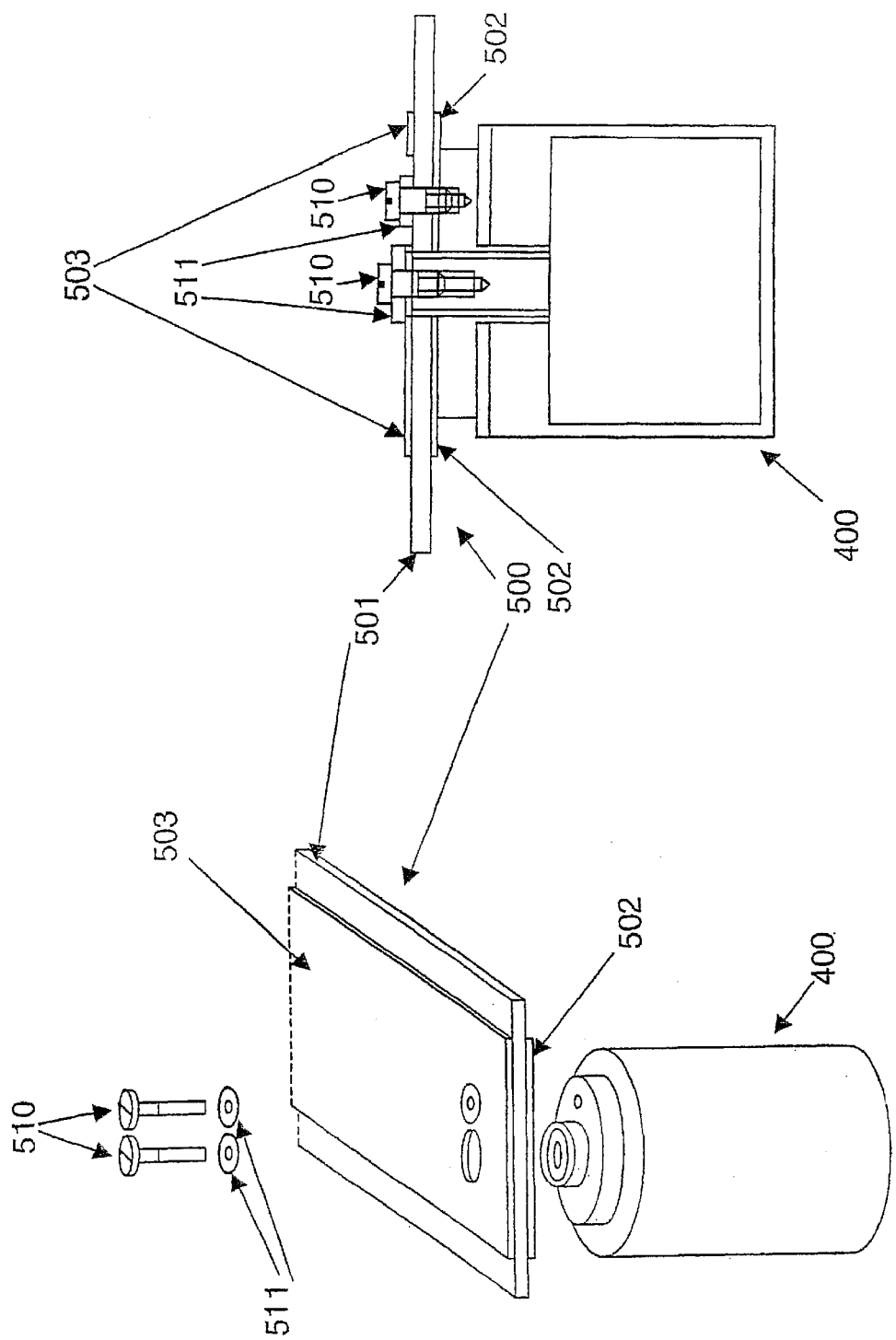

CAPACITOR

FIELD OF THE INVENTION

The present invention relates to a capacitor, such as, for example, an electrolytic capacitor, having a housing part, having at least one capacitor reel which includes two capacitor electrodes insulated from each other by a dielectric and is positioned in the housing part, and having a housing bottom which has at least one feed-through for contacting the capacitor electrodes, and at which outer terminals are arranged for the capacitor electrodes.

BACKGROUND INFORMATION

Such capacitors may be used in practice, for instance, as back-up capacitors in power supply units or as intermediate circuit capacitors, where they may function as energy storage mechanisms. In order to achieve this object, even in connection with rapidly changing signals, they may need to have as low an inductance as possible.

FIG. 1 shows a design of such a capacitor 100, as an exploded illustration. Capacitor 100 includes a capacitor reel 102, which forms the actual capacitance. Capacitor reel 102 is made of two capacitor electrodes 103 and 105 in the form of metal foils, of aluminum, for example, which are insulated from each other by a dielectric. A paper sheet 104 soaked in electrolyte is used here as the dielectric. Thus, capacitor 100 may also be denoted as an electrolyte capacitor. A high capacitance may be implemented in the smallest space by the wound arrangement of the layer sequence 103, 104, 105. For clarity, capacitor reel 102 is shown here partially unwound. Capacitor reel 102 is positioned in a beaker-shaped housing part 101, that may be made of metal. In addition, capacitor 100 includes a housing bottom 109, made of an electrically insulating material, on which are arranged two metallic terminals 110 and 111 for the positive pole and the negative pole of capacitor 100. In the case of large-volume capacitors, as indicated, these outer terminals 110 and 111 are outfitted each with a thread for the screw connection of outer supply leads. Capacitor 100, capacitor electrodes 103 and 105 may be connected to outer terminals 110 and 111 via supply leads 106 and 107 inside the capacitor.

In FIGS. 2a and 2b, two variants 100 and 200 of the above capacitor design of FIG. 1, are shown here in cross section, the cross sectional planes here each running through outer terminals 110 and 111. It should be noted at this point that the same objects are provided with the same reference marks in all the Figures.

In the capacitor variant 110 of FIG. 2, supply leads 106 and 107 inside the capacitor are arranged in the outer region of capacitor reel 102 and are guided vertically upwards to outer terminals 110 and 111 positioned on housing bottom 109. Unwanted inductance of capacitor 100 may result from the design and the arrangement of outer terminals 110 and 111 and current supply leads 106 and 107 internal to the capacitor. Capacitor variant 200 shown in FIG. 2b is discussed in: J. Roumen, "New Aluminum Electrolytic Capacitors with Low Inductance Allow Advanced Frequency Converter Design", PCIM 2000 Conference Proceedings, Session PC, PC6.6. Here, the unwanted inductance in capacitor reel 102 may be reduced by optimization of internal current leads 206 and 207. For this purpose, supply leads 206 and 207 may be positioned further inside capacitor reel 102, compared to supply leads 106 and 107 illustrated in FIG. 2a, and may be guided outwards at an angle to outer terminals 110 and 111.

FIGS. 3a and 3b represent a capacitor 200 before its connection to busbar construction 300. As a cross sectional representation after connection to busbar construction 300, outer terminals 110 and 111 of capacitor 200 are contacted via busbar construction 300. Busbar construction 300 includes two metallic conductors 302 and 303 arranged parallel next to each other on an electrically insulating carrier 301, and these are the actual busbars. Capacitor 200 is electrically connected to the two busbars 302 and 303 by two screws 310 and via two washers 311, and is at the same time mechanically fixed to busbar construction 300. A busbar construction may not be ideal, due to the additional conductance that may result. However, the mechanical construction may fit well with the terminal layout of capacitor 200.

SUMMARY OF THE INVENTION

The exemplary embodiment of the present invention concerns a capacitor of the kind referred to above that has a reduced inductance compared to other capacitors, and which may permit in a simple manner the use of low-inductive current supply leads such as busbars.

According to the exemplary embodiment of the present invention, this may be achieved by having one of the two outer terminals surround the other outer terminal at least partially, and by having the two outer terminals electrically insulated from each other. By an arrangement of the two outer terminals of the capacitor, both the external current supply line as well as the internal current supply line to the capacitor reel may be implemented with very low inductance. Furthermore, the arrangement of the two outer terminals may provide a constructively simple current supply lead to the capacitor reel and simple connection of low-inductive busbars.

There may be additional embodiments and arrangements of the outer terminals of the capacitor according to the present invention, where one of the two terminals encircles the other terminal at least partially. One capacitor variant, in which the two terminals are arranged essentially coaxially and are designed essentially cylinder-shaped, may result in a low additional inductance. But capacitor variants whose terminals are not executed coaxially, and capacitor variants in which the outer lying terminal does not encircle the inner lying terminal completely in a circular cylindrical shape, may also lie within the framework of the present invention.

With a view to the desired reduction in additional inductance, at least one of the outer terminals may be arranged essentially coaxially with the capacitor reel. If the feed-through in the bottom of the housing is also essentially arranged coaxially with the capacitor reel and the outer terminals, the current supply lead to the capacitor reel may also be designed very simply. In this connection, at least one of the outer terminals may reach through the feed-through in the housing bottom into the inside of the housing part, and may directly contact the appropriate capacitor electrode. In one exemplary embodiment of the capacitor according to the present invention, at least the outer terminal arranged to lie inside reaches into the inside of the housing part and may thus be used as winding spindle for the capacitor reel.

The outer terminals of the exemplary capacitor according to the present invention may be furnished with a fastening arrangement for the purpose of fixing outer current supply leads. Screw threads, for instance, may be suitable as a fastening arrangement for screw fastening the current supply leads. In the case of current supply leads in the form of busbars, by using screw fastening, one may establish a pressure connection between the busbars and the corresponding outer terminals, which may ensure good electrical contact.

BRIEF DESCRIPTION OF THE DRAWINGS

FIG. 5a shows the capacitor illustrated in FIGS. 4a and 4b before its connection to a busbar construction.

FIG. 5b shows a cross sectional representation of the electrolyte capacitor illustrated in FIG. 5a after its being connected to a busbar construction.

DETAILED DESCRIPTION

Figure 1:
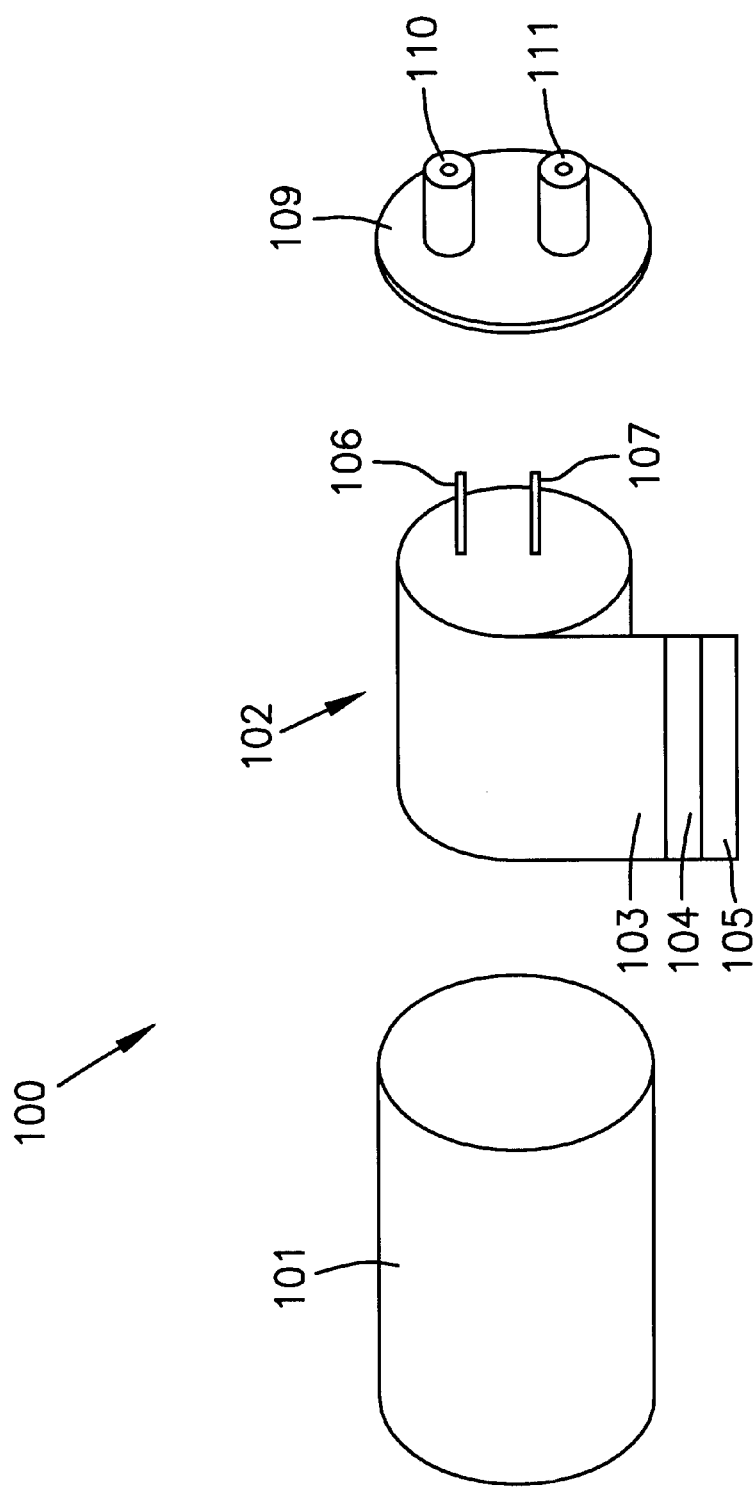
FIG. 1 shows an exploded illustration of an electrolyte capacitor.
Figure 2B:
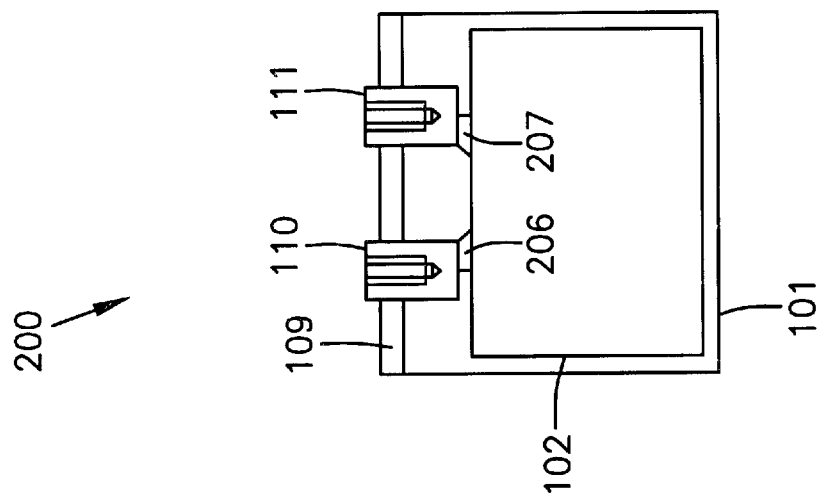
FIG. 2b shows a cross sectional representation of another electrolyte capacitor.
Figure 2A:
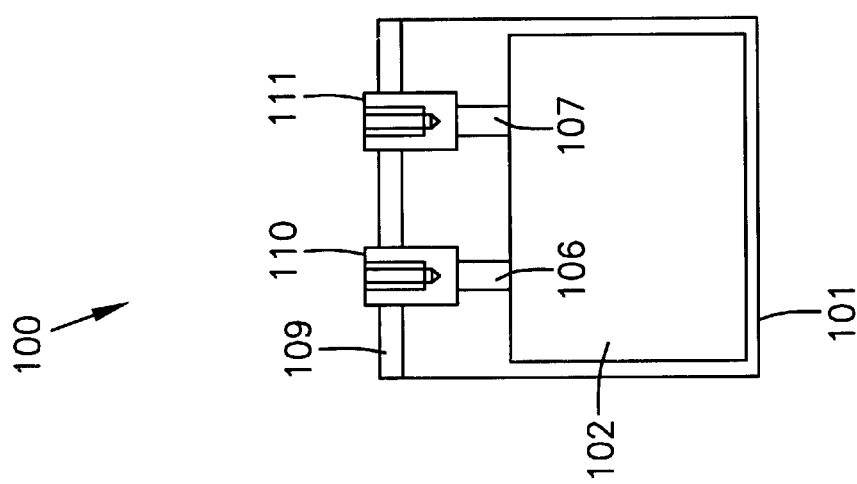
FIG. 2a shows a cross sectional representation of the electrolyte capacitor shown in FIG. 1.
Figure 3B:
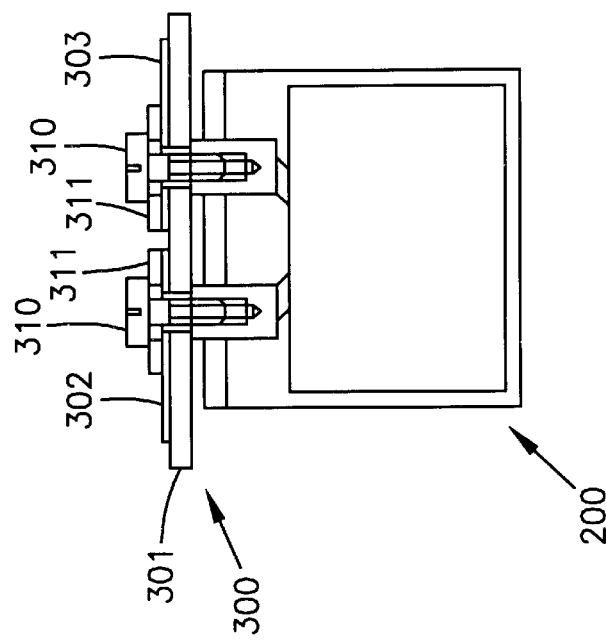
FIG. 3b shows a cross sectional representation of the electrolyte capacitor illustrated in FIG. 3a after being connected to a busbar construction.
Figure 3A:
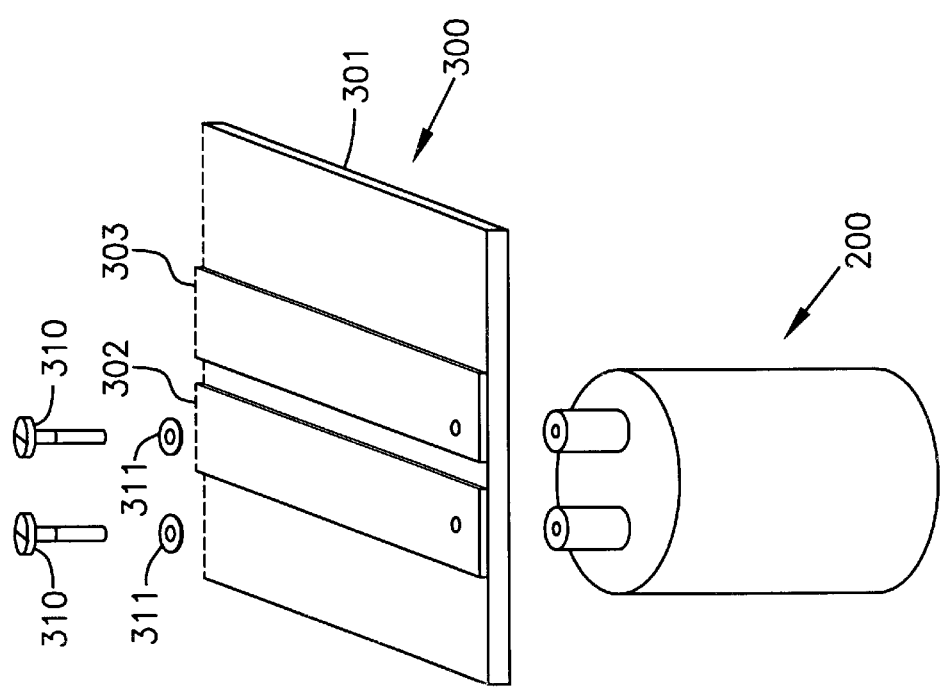
FIG. 3a shows the electrolyte capacitor illustrated in FIG. 2 prior to being connected to a busbar construction.
Figure 4B:
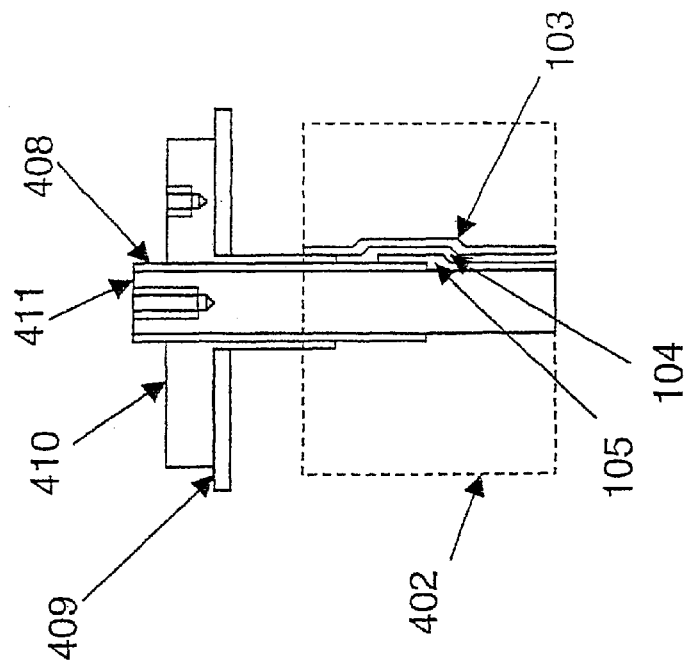
FIG. 4b shows a further cross sectional representation of the capacitor shown in FIG. 4a, having internal electrical contacting of the capacitor electrodes.
Figure 4A:
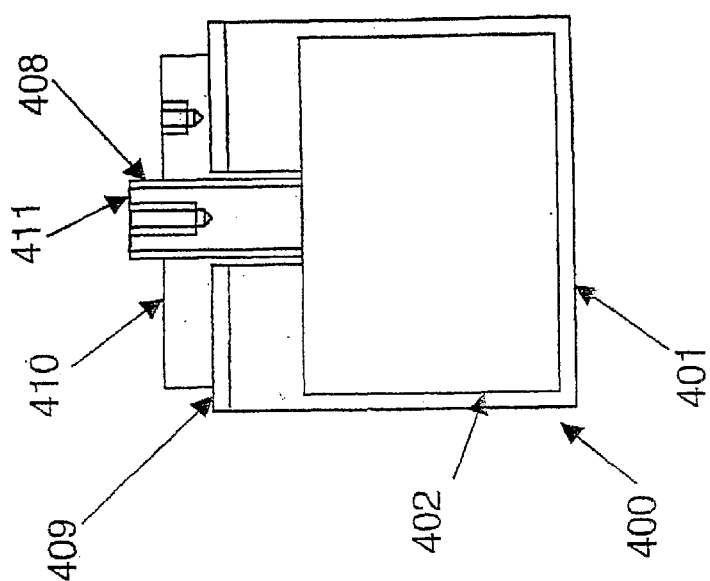
FIG. 4a shows a cross sectional representation of an exemplary embodiment of a capacitor according to the present invention.

Capacitor 400 illustrated in FIG. 4a includes a capacitor reel 402 which forms the actual capacitance of capacitor 400. Capacitor reel 402 may be implemented like capacitor reel 102 illustrated in FIG. 1, and accordingly includes two capacitor electrodes in the form of metal foil electrodes which are insulated from each other by a paper sheet soaked in electrolyte. Capacitor 400 may likewise be an electrolyte capacitor. Capacitor reel 402 is positioned in a metallic housing part 401, which may be designed to be beaker-shaped and may have a circular cross section.

Furthermore, capacitor 400 includes a housing bottom 409 made of an electrically insulating material, having a feed-through for contacting the capacitor electrodes. Metallic outer terminals 410 and 411 are positioned on housing bottom 409 to form the positive and negative poles of capacitor 400.

According to the exemplary embodiment of the present invention, terminal 410 encircles the other terminal 411 at least partially, the two terminals 410 and 411 being electrically insulated from each other.

In the exemplary embodiment of a capacitor according to the present invention, the two terminals 410 and 411 are each formed essentially cylinder-shaped, and positioned essentially coaxially. There is a non-conducting insulating layer 408 between the two terminals 410 and 411, made of plastic, for instance. The two terminals 410 and 411, by the way, are also positioned essentially coaxially with the feed-through in housing bottom 409 and with capacitor reel 402.

In FIG. 4b, the two capacitor electrodes 103 and 105 are each connected directly to the appropriate terminal 410 and 411, respectively. To do this, the two terminals 410 and 411 reach through the feed-through in housing bottom 409 into the inside of housing part 401. At least the upper part of terminal 411, arranged to lie inside, here acts in addition also as winding spindle for capacitor reel 402.

On account of the geometry of outer terminals 410 and 411 and their coaxial arrangement with insulating layer 408 lying between them, and also on account of their coaxial arrangement with respect to the feed-through in housing bottom 409 and capacitor reel 402, the capacitor arrangement illustrated here may be extremely low-inductive. However, when constructing a capacitor according to the exemplary embodiment of the present invention, one may need to make sure that the supply lead to the capacitor reel is made as short as possible.

FIGS. 5a and 5b illustrate a capacitor 400 according to the exemplary embodiment of the present invention in connection with a low-inductive busbar construction 500, which essentially includes an electrically insulating carrier 501, on each of whose main surfaces a metallic conductor 502 and 503 are arranged. The mechanical fastening of capacitor 400 to busbar construction 500 is accomplished definitively with the aid of a screw 510 which is screwed down through busbar construction 500 via washer 511 into a thread formed in terminal 411 arranged to lie on the inside. Using this central fastening, an electrical feed-through of upper busbar 503 to terminal 411 is made, as well as an electrical feed-through of lower busbar 502 to terminal 410. Here, insulating layer 408 between terminals 410 and 411 may prevent short circuits or electrical sparkover. Screw 510 screwed through busbar construction 500 into terminal 410 lying on the outside, is used together with the respective washer 511 for further mechanical fastening. This represents a protection against twisting and thereby may prevent loosening of capacitor 400 from busbar construction 500. In upper busbar 503 an opening for washer 511 is provided, so that the two busbars 503 and 502 may not be short-circuited by being screwed together with outlying terminal 410.

In summary, an exemplary capacitor according to the present invention may be actualized in an extremely low-inductive form, and may be electrically contacted in a particularly simple manner via busbars that are low-inductive and arranged one above the other.

What is claimed is:

1. A capacitor comprising:

a housing part;

at least one capacitor reel arranged in the housing part, and including a dielectric and two capacitor electrodes electrically insulated from each other by the dielectric; and a housing bottom including at least one feed-through to contact the two capacitor electrodes, wherein two outer terminals of the two capacitor electrodes are arranged on the housing bottom, and one of the two outer terminals encircles the other outer terminal at least partially.

2. The capacitor of claim 1, wherein the two outer terminals are positioned essentially coaxially.

3. The capacitor of claim 1, wherein the two outer terminals are essentially cylinder-shaped.

4. The capacitor of claim 1, wherein at least one of the two outer terminals is positioned essentially coaxially with the at least one capacitor reel.

5. The capacitor of claim 1, wherein the feed-through is positioned essentially coaxially with the at least one capacitor reel and with the two outer terminals.

6. The capacitor of claim 5, wherein at least one of the two outer terminals is arranged to reach through the at least one feed-through in the housing bottom into an inside of the housing part and to contact directly a respective electrode of the two capacitor electrodes.

7. The capacitor of claim 1, wherein at least a first outer terminal of the two terminals is arranged to lie inside the capacitor and reach into an inside of housing part, the first outer terminal being used as a winding spindle for the at least one capacitor reel.

8. The capacitor of claim 1, wherein the two outer terminals each include a fastening arrangement for fastening to outer current supply leads.

9. The capacitor of claim 8, wherein the fastening arrangement includes at least one thread to screw-fasten the outer current supply leads.

10. The capacitor of claim 1, wherein at least one of the two outer terminals is electrically contacted via busbars.

11. The capacitor of claim 1, wherein the capacitor includes an electrolyte capacitor.

* * * * *